US010924242B2

United States Patent
Jo et al.

(10) Patent No.: US 10,924,242 B2
(45) Date of Patent: *Feb. 16, 2021

(54) METHOD FOR TRANSMITTING OR RECEIVING SIGNAL IN WIRELESS COMMUNICATION SYSTEM AND APPARATUS THEREFOR

(71) Applicant: LG Electronics Inc., Seoul (KR)

(72) Inventors: Soonki Jo, Seoul (KR); Yunjung Yi, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/064,907

(22) PCT Filed: May 3, 2018

(86) PCT No.: PCT/KR2018/005138
§ 371 (c)(1),
(2) Date: Nov. 8, 2018

(87) PCT Pub. No.: WO2018/203681
PCT Pub. Date: Nov. 8, 2018

(65) Prior Publication Data
US 2020/0127760 A1   Apr. 23, 2020

Related U.S. Application Data

(60) Provisional application No. 62/500,557, filed on May 3, 2017.

(51) Int. Cl.
H04L 25/02 (2006.01)
H04L 1/00 (2006.01)
(Continued)

(52) U.S. Cl.
CPC ............ *H04L 5/005* (2013.01); *H04L 1/0038* (2013.01); *H04L 1/0057* (2013.01);
(Continued)

(58) Field of Classification Search
CPC ........... H04W 72/042; H04W 72/1289; H04W 52/146; H04L 5/0053
See application file for complete search history.

(56) References Cited

U.S. PATENT DOCUMENTS 9,473,281 B2   10/2016  Hooli et al.
2015/0289144 A1  10/2015  Yi et al.
(Continued)

FOREIGN PATENT DOCUMENTS

CN  104737479  6/2015
CN  106464642  2/2017
(Continued)

OTHER PUBLICATIONS

United States Office Action in U.S. Appl. No. 16/263,794, dated May 29, 2019, 12 pages.
(Continued)

*Primary Examiner* — Iqbal Zaidi
(74) *Attorney, Agent, or Firm* — Fish & Richardson P.C.

(57) ABSTRACT

A method for receiving downlink control information by a terminal in a wireless communication system according to an embodiment of the present invention may comprise the steps of: performing blind detection of a group-common physical downlink control channel (PDCCH) in a common search space (CSS) having a plurality of PDCCH candidates; and acquiring downlink control information (DCI) indicating a slot format from the group-common PDCCH acquired through the blind detection, wherein, in the blind detection of the group-common PDCCH, the terminal attempts to selectively detect the group-common PDCCH
(Continued)

for only a PDCCH candidate at a predetermined position in the CSS having the plurality of PDCCH candidates.

14 Claims, 9 Drawing Sheets

(51) Int. Cl.
*H04W 80/08* (2009.01)
*H04L 5/00* (2006.01)
*H04W 76/11* (2018.01)
*H04W 72/04* (2009.01)

(52) U.S. Cl.
CPC ........ *H04L 1/0061* (2013.01); *H04L 25/0238* (2013.01); *H04W 72/042* (2013.01); *H04W 72/0446* (2013.01); *H04W 76/11* (2018.02); *H04W 80/08* (2013.01)

(56) References Cited

U.S. PATENT DOCUMENTS

| | | | |
|---|---|---|---|
| 2016/0254878 A1* | 9/2016 | Wang | H04L 5/0053 370/329 |
| 2018/0220400 A1 | 8/2018 | Nogami et al. | |
| 2018/0279229 A1* | 9/2018 | Dinan | H04W 52/146 |
| 2018/0279297 A1* | 9/2018 | Nogami | H04L 1/08 |
| 2018/0279303 A1 | 9/2018 | Sun et al. | |
| 2018/0279304 A1 | 9/2018 | Lee et al. | |
| 2018/0324816 A1 | 11/2018 | Islam et al. | |

FOREIGN PATENT DOCUMENTS

| | | |
|---|---|---|
| JP | 2015527840 | 9/2015 |
| KR | 1020120016013 | 2/2012 |
| KR | 1020140104498 | 8/2014 |
| KR | 101468767 | 12/2014 |
| KR | 1020150093156 | 8/2015 |
| KR | 1020150105306 | 9/2015 |
| KR | 1020150110540 | 10/2015 |
| WO | WO2012011240 | 9/2013 |
| WO | WO2014047955 | 3/2014 |
| WO | WO2014073856 | 5/2014 |
| WO | WO2015076619 | 5/2015 |
| WO | WO2015166892 | 4/2017 |

OTHER PUBLICATIONS

LG Electronics, "Discussion on sPDCCH design", R1-1702422, 3GPP TSG RAN WG1 Meeting #88, Athens, Greece, Feb. 13-17, 2017, 6 pages.
Extended European Search Report in European Application No. 18793768.5, dated Mar. 2, 2020, 7 pages.
Japanese Office Action in Japanese Application No. 2019-511544, dated Mar. 31, 2020, 4 pages (with English translation).
LG Electronics, "Further discussion on common signaling," R1-1702474, 3GPP TSG RAN WG1 Meeting #88, Athens, Greece, dated Feb. 13-17, 2017, 6 pages, XP051209628.
MediaTek Inc., "Common PDCCH design," R1-1702717, 3GPP TSG RAN WG1 Meeting #88, Athens, Greece, dated Feb. 13-17, 2017, 6 pages, XP051209864.
United States Notice of Allowance in U.S. Appl. No. 16/263,794 dated May 11, 2020, 15 pages.
Chinese Office Action in Chinese Application No. 201880016778.8, dated Aug. 27, 2020, 15 pages (with English translation).

* cited by examiner (a)

(b)

(c)

(a)

(b)

(c)

(d)

(a)

(b)

(a)

(b)

(a)

(b)

METHOD FOR TRANSMITTING OR RECEIVING SIGNAL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/005138, filed on May 3, 2018, which claims the benefit of U.S. Provisional Application No. 62/500,557, filed on May 3, 2017. The disclosures of the prior applications are incorporated by reference in their entirety.

TECHNICAL FIELD

The present invention relates to a wireless communication system and, more particularly, to a method and apparatus for transmitting or receiving downlink (DL) control information in a wireless communication system.

BACKGROUND ART

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Problem

An object of the present invention devised to solve the problem lies in a method and apparatus for more effectively and accurately transmitting and receiving downlink (DL) control information indicating a slot format through a group common physical downlink control channel (PDCCH).

It is to be understood that both the foregoing general description and the following detailed description of the present invention are exemplary and explanatory and are intended to provide further explanation of the invention as claimed.

Technical Solution

The object of the present invention can be achieved by providing a method of receiving downlink control information (DCI) by a user equipment (UE) in a wireless communication system, including performing blind detection for a group common physical downlink control channel (PDCCH) in a common search space (CSS) having a plurality of PDCCH candidates, and obtaining downlink control information (DCI) indicating a slot format from the blind-detected group common PDCCH, wherein, in the blind detection of the group common PDCCH, the UE selectively attempts to detect the group common PDCCH only on a PDCCH candidate at a predetermined position in the CSS having the plurality of PDCCH candidates.

In another aspect of the present invention, provided herein is a method of transmitting downlink control information (DCI) by a base station (BS) in a wireless communication system, including generating downlink control information (DCI) indicating a slot format, mapping a group common physical downlink control channel (PDCCH) to a common search space (CSS) having a plurality of PDCCH candidates, and transmitting the DCI through the group common PDCCH, wherein the group common PDCCH is selectively mapped only on a PDCCH candidate at a predetermined position in the CSS having the plurality of PDCCH candidates.

In another aspect of the present invention, provided herein is a user equipment (UE) for receiving downlink control information (DCI) including a receiver, and a processor configured to control the receiver to perform blind detection for a group common physical downlink control channel (PDCCH) in a common search space (CSS) having a plurality of PDCCH candidates and to acquire downlink control information (DCI) indicating a slot format from the blind-detected group common PDCCH, wherein, in the blind detection of the group common PDCCH, the processor selectively attempts to detect the group common PDCCH only on a PDCCH candidate at a predetermined position in the CSS having the plurality of PDCCH candidates.

In another aspect of the present invention, provided herein is a base station (BS) for transmitting downlink control information (DCI), including a processor configured to generate downlink control information (DCI) indicating a slot format and to map a group common physical downlink control channel (PDCCH) to a common search space (CSS) having a plurality of PDCCH candidates, and a transmitter configured to transmit the DCI through the group common PDCCH according to control of the processor, wherein the group common PDCCH is selectively mapped only on a PDCCH candidate at a predetermined position in the CSS having the plurality of PDCCH candidates.

The UE may receive information regarding the group common PDCCH via higher layer signaling. The UE may determine the PDCCH candidate at the predetermined position for the blind detection of the group common PDCCH through the information regarding the group common PDCCH.

A radio network temporary identifier (RNTI) for slot format indication may be allocated to the UE. The UE may perform blind detection for the group common PDCCH using the RNTI for slot format indication. In the blind detection of the group common PDCCH, the UE may determine whether the PDCCH candidate at the predetermined position corresponds to the group common PDCCH by checking cyclic redundancy check (CRC) information of the PDCCH candidate at the predetermined position using the RNTI for slot formation indication.

The UE may attempt to detect other PDCCHs for carrying different DCI from the DCI indicating the slot format, on the other PDCCH candidates in which detection of the group common PDCCH is not attempted among the plurality of PDCCH candidates included in the CSS. The UE may attempt to detect the other PDCCHs along with the group common PDCCH on the PDCCH candidate at the predetermined position.

The UE may attempt to detect the group common PDCCH at least for an initial PDCCH candidate among the plurality of PDCCH candidates included in the CSS.

The group search space (GSS) for the group common PDCCH may be configured in the CSS.

The number of PDCCH candidates at the predetermined position for the blind detection of the group common PDCCH may not be greater than the number of the plurality of PDCCH candidates included in the CSS.

When the number of PDCCH candidates at the predetermined position is two or more, the two or more PDCCH candidates for blind detection of the group common PDCCH may be contiguous.

The UE may receive slot format patterns each corresponding to a combination of a plurality of slots via higher layer signaling. One of the slot format patterns may be indicated to the UE through the DCI.

Advantageous Effects

According to an embodiment of the present invention, a group common physical downlink control channel (PDCCH) for delivering downlink control information (DCI) indicating a slot format may be mapped into a common search space (CSS) and, in particular, it may be possible to map the group common PDCCH only on a PDCCH candidate at a predetermined position among PDCCH candidates of the CSS and, thus, a radio resource for transmission and reception of the group common PDCCH may be obviously defined and overhead may be reduced during blind detection of the group common PDCCH by a user equipment (UE).

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

MODE FOR INVENTION

Figure 1:
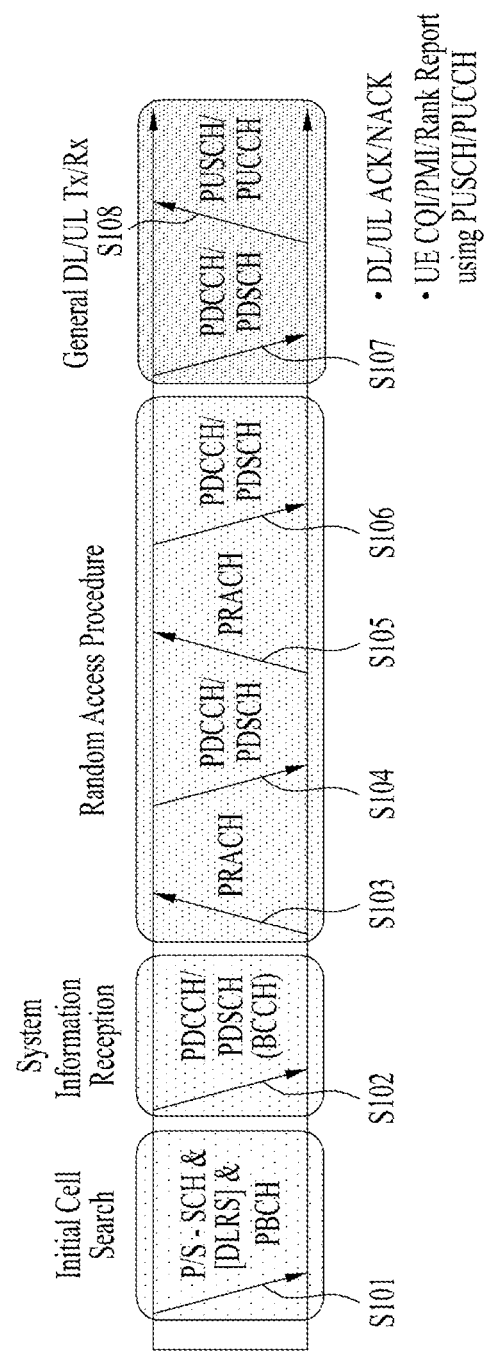
FIG. 1 illustrates physical channels used in a 3GPP LTE/LTE-A system and a general signal transmission method using the physical channels.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu}=N_{symb}^{slot} \times N_{symb}^{subframe,\mu}$ contiguous OFDM symbols. $N_{symb}^{slot}$ represents the number of symbols per slot, μ represents OFDM numerology, and $N_{symb}^{subframe,\mu}$ represents the number of slots per subframe with respect to corresponding μ. In NR, multiple OFDM numerologies shown in Table 1 below may be supported.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, Δf refers to subcarrier spacing (SCS). μ and cyclic prefix with respect to a DL carrier bandwidth part (BWP) and μ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

As such, in an NR system, the number of slots included in 1 subframe may be variable depending on subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc.

An REG may correspond to 1 OFDM symbol in the time domain and may correspond to 1 PRB in the frequency domain. In addition, 1 CCE may correspond to 6 REGs. The number of CCEs configuring one control channel candidate may be changed depending on an aggregation level (AL). For example, when an AL is N, the control channel candidate may include N CCEs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station may signal information on a CORESET to a UE. For example, a CORESET configuration for each CORESET may be signaled. For example, at least one of time duration (e.g., 1/2/3 symbol) of a corresponding CORESET, a frequency domain resource (e.g., RB set), an REG-to-CCE mapping type (e.g., interleaved/non-interleaved), precoding granularity, an REG bundling size (e.g., in the case of an interleaved mapping type), an interleaver size (e.g., in the case of an interleaved mapping type), and a DMRS configuration (e.g., scrambling ID) may be signaled through the CORESET configuration. When interleaving for distributing a CCE is applied to a 1-symbol CORESET, bundling of 2 or 6 REGs may be performed. Bundling of 2 or 6 REGs may be performed on a 2-symbol CORESET and time first mapping may be applied. Bundling of 3 or 6 REGs may be performed on a 3 symbol-CORESET and time first mapping may be applied. When REG bundling is performed, a UE may assume the same precoding with respect to a corresponding bundling unit.

<Group Common PDCCH>

Hereinafter, the content and expected payload size of DCI transmitted through a group common PDCCH are described.

A signaling method of the group common PDCCH is described now. An example of the signaling method may include a method of allocating and transmitting a reserved resource and a method of configuring and transmitting a search space.

When information on a slot type is transmitted through the group common PDCCH, whether a method of transmitting a slot type to a UE that operates with a plurality of CCs is effective is described below.

1. Contents of Group Common PDCCH
   (1) Slot Format Indication

The group common PDCCH may be used to notify a UE about a slot format. The slot format may be indicated in various types. A payload size of DCI transmitted through the group common PDCCH may be variable according to a type of an indicated slot format. A network may configure the payload size of the DCI transmitted through the group common PDCCH for a UE via higher layer signaling.

A size of 1 slot (e.g., length in the time domain) may be changed according to numerology. A 1-symbol length (i.e., time duration) based on SCS of 15 kHz may be the same as a 4-symbol length based on SCS of 60 kHz. SCS of 15 kHz and 60 kHz may be exemplary and the same method may also be applied to the various SCSs described with reference to Table 1 above. For example, when SCS 1 is A kHz, SCS 2 is B kHz, and a relationship between B=A*M is satisfied (where A, B, and M are a natural number), a 1-OFDM symbol length based on SCS 1 may be the same as an M-OFDM symbol length based on SCS 2.

The group common PDCCH may indicate a slot format based on the reference numerology irrespective of an actual numerology used in a UE. The reference numerology may be indicated by the network (e.g., RRC signaling) or pre-configured. For example, smallest SCS among various SCSs configured for UEs by the network may be used as the reference numerology. Based on the reference numerology, the UE may interpret an indicated slot type as numerology of the UE or may estimate an appropriate size of a slot irrespective of numerology to be used in the UE.

According to another embodiment of the present invention, the number of symbols configuring 1 slot may also be changed according to numerology.

(i) Slot Type

The group common PDCCH may indicate a type of at least one slot.

For example, a slot may be classified as shown in Table 4 below but is not limited thereto

TABLE 4

| Slot | Description |
|---|---|
| D only | Slot in which only downlink is supported |
| U only | Slot in which only uplink is supported |
| D-centric | Slot in which downlink is supported in most symbols configuring slot |
| U-centric | Slot in which uplink is supported in most symbols configuring slot |
| Data region (DR) | Slot used for other data but not UE specific data like in MBSFN subframe |
| Reserved | Slot occupied by a network as necessary but not UE specific use |

In the case of D-centric and U-centric slot types, only whether a corresponding slot is D-centric or U-centric may be indicated and, thus, a configuration (e.g., downlink and uplink) of an actual symbol included in the corresponding slot needs to be predefined. A DL/UL portion in a D/U-centric slot may be predefined or may be configured by a network. One or more D/U-centric patterns may be present according to a DL/UL resource configuration.

Use of the reserved/DR slot may be predefined or not. For example, the use of the reserved/DR slot may be predefined via system information, higher layer indication, or the like. When the use of a reserved/DR slot is not defined, a network may simultaneously notify a UE about the use while indicating a slot type through the group common PDCCH or may not indicate the use if it is not required for the UE to know the use of the reserved/DR slot. The reserved resource may be separately configured from a slot type. For example, the network may configure a reserved resource via dynamic/semi-static signaling.

(ii) Slot Type Pattern

A group common PDCCH may indicate a type of a plurality of slots. For example, the group common PDCCH may indicate at least one of combinations of a plurality of slots. When a network indicates respective types of a plurality of slots one by one, it may be ineffective that a payload size of the group common PDCCH is increased and signaling overhead is increased. Accordingly, the number of slots to be indicated and each slot type may be defined as one pattern, and the network may notify the UE(s) about an index of the pattern through the group common PDCCH.

A plurality of slot type patterns may be defined. For example, the slot type pattern may be defined as [periodicity/slot types or patterns or a set of slot types] but is not limited thereto.

Figure 2:
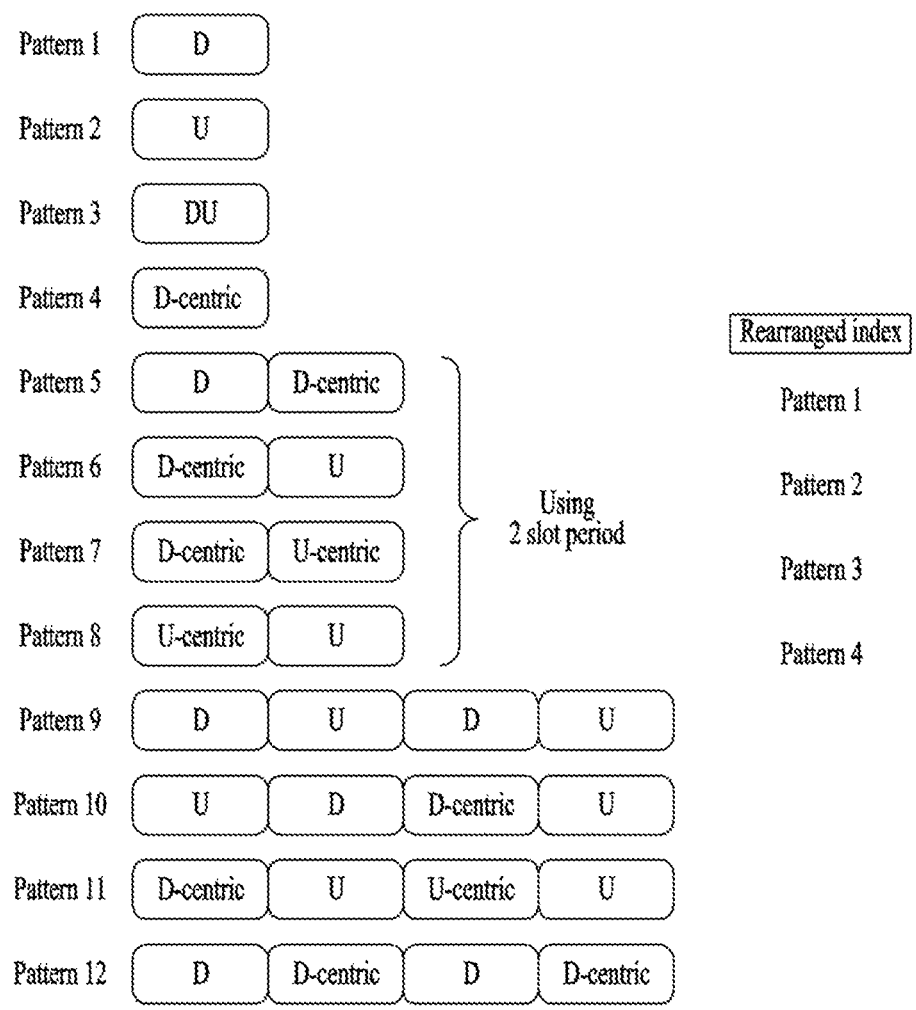
FIG. 2 illustrates patterns of slot formats according to an embodiment of the present invention.

FIG. 2 illustrates patterns of slot formats according to an embodiment of the present invention. In FIG. 2, DU refers to a symbol, a half of which is D symbols and the other half of which is U symbols.

In the case of an FDD system, a slot corresponding to D in FIG. 2 may correspond to a slot format of a DL band (e.g., DL BWP) and a slot corresponding to U in FIG. 2 may be interpreted as a slot format of a UL band (e.g., UL BWP). For example, a configuration of a pattern obtained by combining a D slot format and a U slot format for a UE by a base station may be interpreted as a configuration of a pattern obtained by combining a slot format of a DL band (e.g., DL BWP) and a slot format of a UL band (e.g., UL BWP) for the UE by the base station.

A plurality of slot type patterns to be used in a corresponding cell or a corresponding group may be defined/configured and a network may notify a UE about patterns to be used among a plurality of slot type patterns. For example, a subset may be signaled to the UE among defined patterns. FIG. 2 illustrates 12 of total patterns and, in this case, information indicating that patterns #5 to #8 defined using 2 slot sections among 12 patterns are available may be signaled (e.g., higher layer signaling) to the UE. In this case, 4 patterns #5 to #8 may be re-indexed and may be considered as patterns #1 to #4.

As such, when a subset of slot type patterns is pre-notified to the UE, the network may sequentially transmit only the indexes (e.g., any one of #1 to #4) of the re-indexed patterns to the group common PDCCH. Accordingly, signaling overhead of the group common PDCCH may be reduced. For example, the group common PDCCH may not inevitably cover all 12 patterns and may be configured to cover 4 patterns and, in this case, a payload size of the group common PDCCH may be reduced.

Although the above description has been given in terms of 1 UE, the group common PDCCH is a control channel that is commonly transmitted to a UE group configuring a plurality of UE(s) and, thus, DCI delivered by the group common PDCCH may include a plurality of slot format indications of a plurality of UEs belonging to the UE group. For example, the group common PDCCH transmitted with respect to a UE group={$UE_1$, $UE_2$, . . . , $UE_k$} may indicate k slot format patterns={$Pattern_1$, $Pattern_2$, . . . , $Pattern_k$}. Each UE may obtain a slot format pattern of a position corresponding to the UE among k slot format patterns. For example, it may be assumed that 4 patterns #5 to #8 as a subset among 12 patterns illustrated in FIG. 2 are signaled to $UE_1$ via higher layer signaling and the patterns #5 to #8 that are signaled via higher layer signaling are re-indexed and correspond to patterns #1 to #4. When an index of $Pattern_1$ indicated to $UE_1$ through the group common PDCCH is #2, $UE_1$ may recognize that a slot format indicated by the network is [D-centric, U].

Information on the subset of the slot type patterns may be transmitted to the UE through a MAC control element (CE) or may be transmitted through the group common PDCCH. Alternatively, the network may predefine a period in which a pattern is to be indicated through system information. Alternatively, information on a subset of slot type patterns may be transmitted via UE-specific higher layer signaling.

A pattern of a long period may be defined in the form in which patterns of short periods are repeated. In this case, in a situation in which the network needs to simultaneously indicate two slot formats, pattern information on the long period may be advantageously replaced with pattern information on the short period.

(iii) Symbol Unit Indication

According to another embodiment of the present invention, a group common PDCCH may indicate a slot type in units of symbols configuring a slot. For example, a resource type such as D/U/Reserved in Table 6 below may be applied in units of symbols.

Table 5 below shows an exemplary slot format under the assumption that 1 slot includes 7 symbols.

TABLE 5

| Slot Format | Symbol 0 | Symbol 1 | Symbol 2 | Symbol 3 | Symbol 4 | Symbol 5 | Symbol 6 |
|---|---|---|---|---|---|---|---|
| 1 | D | D | D | D | U | U | U |
| 2 | D | D | R | R | R | R | U |
| 3 | D | U | U | U | U | U | U |
| 4 | D | D | DR | DR | DR | DR | DR |
| . . . | | | | | | | |

(iv) Symbol Pattern

Although the method of indicating an index of a slot pattern by a group common PDCCH has been described above, the group common PDCCH may indicate an index of a symbol pattern according to another embodiment of the present invention.

[Table 6]

Table 6 below shows an exemplary symbol pattern (or slot format) under the assumption 1 slot includes 7 symbols.

TABLE 6

| Symbol Pattern | Symbol 0 | Symbol 1 | Symbol 2 | Symbol 3 | Symbol 4 | Symbol 5 | Symbol 6 |
|---|---|---|---|---|---|---|---|
| 1 | D | D | D | R | R | U | U |
| 2 | D | DR | DR | DR | U | U | U |
| 3 | R | R | R | R | R | U | U |
| . . . | | | | | | | |

(2) Other Information

The group common PDCCH may further include other information in addition to slot format information.

(i) Puncturing Indication: The group common PDCCH may include puncturing information for URLLC. A period used as the URLLC may be indicated in units of slots or in units of symbols.

(ii) Semi-Static Resource Information: The group common PDCCH may include information on a semi-static resource such as CSI-RS. For example, the group common PDCCH may indicate information on what is a corresponding semi-static resource or information on a period, transmission time duration, and the like when the corresponding semi-static resource has the period.

2. Transmission of Group Common PDCCH

As a method of transmitting a group common PDCCH by a network, (1) a method of ensuring and transmitting a reserved resource for the group common PDCCH and (2) a method of configuring and transmitting a search space for the group common PDCCH may be considered. However, the configuration of the search space for the group common PDCCH may be interpreted as reservation of a resource for the group common PDCCH or the opposite case may be interpreted in the same way. Such classification of the methods (1) and (2) may be logical classification for convenience of description and the methods (1) and (2) may be combined without conflicting with each other.

(1) Transmission of Group Common PDCCH Using Reserved Resource

A network may pre-ensure a resource (e.g., RE, REG, RB, and CCE) in which a group common PDCCH is to be transmitted.

The group common PDCCH may also be a control channel and, thus, may be deployed on a CORESET. In addition, it may be desirable to deploy a position of the reserved resource for the group common PDCCH to minimize blocking with other control channels. In particular, the group common PDCCH may avoid blocking with a CSS to a maximum degree.

When a position in a logical domain, in which a control channel is transmitted, is defined, a logical position of the reserved resource for the group common PDCCH may be immediately before or behind the CSS. Alternatively, the reserved resource for the group common PDCCH may be positioned at the last portion of a CORESET or may be positioned to be spaced apart from a start index or end index of the CSS by predetermined offset. In this case, the offset may be different for each cell/group. The offset may be notified to a UE via system information, higher layer signaling, or the like.

Alternatively, the resource for the group common PDCCH may be deployed in the CSS. In this case, a size of the group common PDCCH may be equal to or less than a size of a smallest candidate among control channel candidates in the CSS. In this case, the reserved resource for the group common PDCCH may be included in the candidate of the CSS and, in this regard, the UE may basically perform blind detection (DB) on the CSS irrespective of whether the group common PDCCH is detected in the reserved resource in the CSS.

Figure 3:
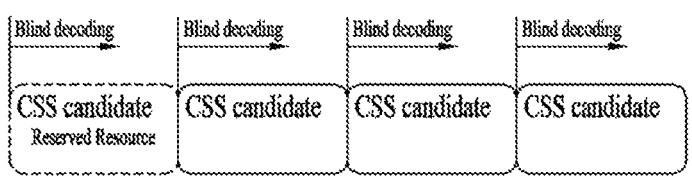
FIG. 3 illustrates reserved resource allocation for a group common PDCCH according to an embodiment of the present invention.
Figure 3:
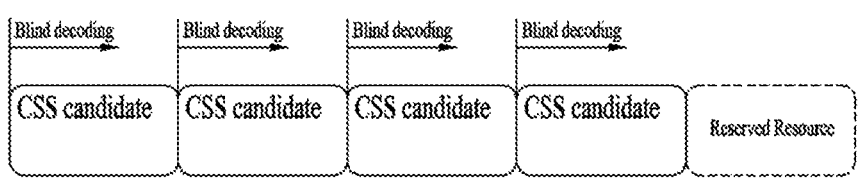
Figure 3:
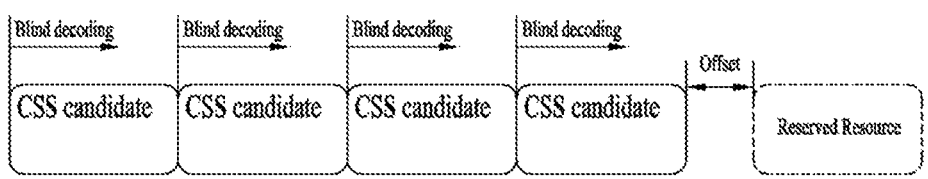

Information (e.g., a position of a reserved resource) for the group common PDCCH may be notified to the UE via system information, higher layer signaling, or the like. When the group common PDCCH is transmitted through a candidate on the CSS, the number of available candidates may be reduced to transmit PDCCH (e.g., common control information but not a group common PDCCH) in the CSS, which causes a similar result to CSS blocking. Accordingly, when the group common PDCCH is configured in a CSS, the UE may assume that a candidate, to which the group common PDCCH is mapped, is not used as a CSS candidate of another channel and may assume the candidate to be an invalid candidate. The UE may skip blind detection for the invalid candidate and may proceed to a next candidate. In addition, the group common PDCCH may be defined to be transmitted using a CSS like a general PDCCH and, in this case, a general blind detection procedure on the CSS may also be performed on the group common PDCCH in the same way FIG. 3 illustrates reserved resource allocation for a group common PDCCH according to an embodiment of the present invention. The group common PDCCH may be mapped to a block indicated by dotted lines in FIG. 3.

(a) of FIG. 3 illustrates the case in which a reserved resource for the group common PDCCH is allocated to a first candidate. Accordingly, a UE may perform blind detection of the group common PDCCH with respect to the corresponding block. For example, the UE may perform blind detection for the group common PDCCH with respect to a first candidate using a G-RNTI to be described below. Although (a) of FIG. 3 illustrates the case in which only the first candidate is allocated to a reserved resource for the group common PDCCH for convenience, the present invention is not limited thereto and, for example, first N candidates may include a reserved resource for the group common PDCCH. As described above, a position of a reserved resource may be notified to the UE via higher layer signaling. For example, the network may notify the UE about an N value as information on the position of the reserved via higher layer signaling.

(b) of FIG. 3 illustrates the case in which a reserved resource for the group common PDCCH is allocated to a next portion of the last candidate. (c) of FIG. 3 illustrates the case in which a reserved resource for the group common PDCCH is allocated to a position with predetermined offset from the last candidate.

(2) Transmission of Group Common PDCCH Through Search Space

A network may configure a search space in which a group common PDCCH is to be transmitted and a UE may perform blind detection in a corresponding search space to detect a group common PDCCH.

(i) With the G-RNTI

For convenience, a search space in which a group common PDCCH is to be transmitted is referred to as a group common search space (GSS). A radio network temporary identifier (RNTI) required for detection of the group common PDCCH in the GSS is referred to as a group (G)-RNTI. For example, a CRC of the group common PDCCH may be scrambled or masked through the G-RNTI. The term of RNTI for transmission of the group common PDCCH indicating a slot format may not be limited to the G-RNTI and may also be referred to other terms, for example, a slot format indication (SFI)-RNTI.

1 UE may have one or plural G-RNTIs. For example, one UE may be configured with one or plural GSSs. The GSS may be defined irrespective of the number thereof.

a. GSS in CSS (Common Search Space)

For example, a network may randomly deploy in a CSS. Alternatively, as described above, the network may be deployed at a position in the CSS, in which the GSS is predefined/higher layer-signaled. To deploy the GSS in the CSS, the size and/or the number of candidates of the GSS may be equal to or less than the size and/or the number of candidates of the CSS. For example, some of CSS candidates may be allocated for use of GSS candidates. Candidates of the GSS may be contiguously deployed or may be separately distributed and deployed.

When a size of a candidate of the GSS is the same as a size of a candidate of the CSS, a UE needs to additionally perform only CRS examination on the GSS (e.g., CRC examination through R-RNTI) while performing blind detection for the CSS and, thus, a problem in terms of overhead of additional blind detection due to additional deployment of the GSS may be overcome.

Figure 4:
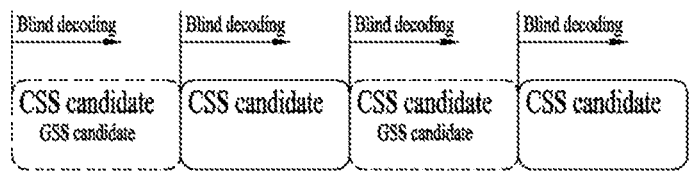
FIG. 4 illustrates a GSS deployed in a CSS according to an embodiment of the present invention.
Figure 4:
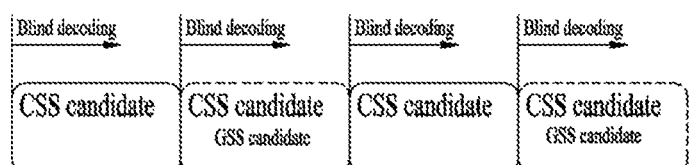
Figure 4:
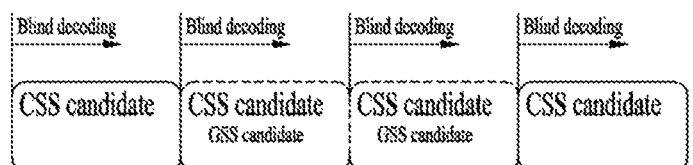
Figure 4:
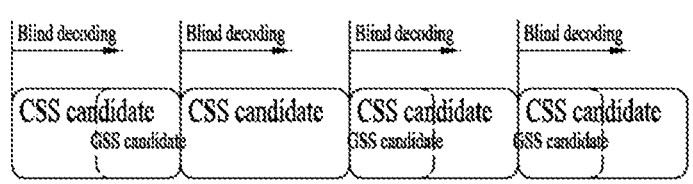

FIG. 4 illustrates a GSS deployed in a CSS according to an embodiment of the present invention.

An environment in which a size of a largest candidate among GSS candidates is equal to or smaller than a size of the smallest candidate of a CSS and the number of GSS candidates is equal to or less than a half of the number of CSS candidates may be considered.

b. GSS in CORESET

Similarly to a USS, a network may randomly deploy GSSs across a CORESET according to a hashing function using a G-RNTI. Candidates of a GSS may be contiguously deployed or may be separately distributed and deployed.

(ii) Without the G-RNTI a. GSS in CSS

A network may deploy a GSS in a CSS. The present embodiment is partially similar to the aforementioned method of deploying the GSS in the CSS but, according to the present embodiment, the network may form the GSS and may deploy the GSS in the CSS to reduce the possibility of blocking with a control channel to be transmitted in the CSS. The size/number of GSSs may be equal to or less than the size/number of CSS candidates.

When there is no G-RNTI, a position of a candidate of a GSS needs to be determined. For example, first K candidates (or an $N^{th}$ to $M^{th}$ candidates) among candidates included in the CSS may be used as a GSS candidates. When a size of the candidate of the GSS is the same as a size of a candidate of the CSS, a UE a UE needs to additionally perform only CRS examination on the GSS while performing blind detection for the CSS and, thus, the number of additional blind detections due to additional deployment of the GSS may be reduced.

The pre-definition/configuration of a position of a candidate of a GSS in a CSS may not be limited to the case without a G-RNTI and, it would be obvious to one of ordinary skill in the art that the position of the candidate of the GSS is predefined/configured in the CSS even if the G-RNTI is used.

A position of a GSS candidate to be deployed in each CSS candidate may be signaled or predefined via system information or higher layer signaling. Candidates of the GSS may be contiguously deployed or may be separately distributed or deployed.

Figure 5:
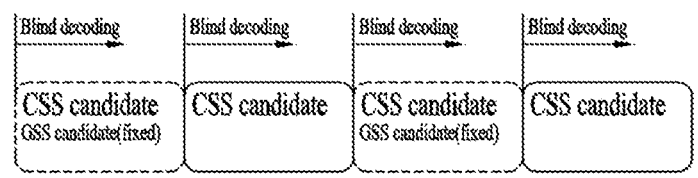
FIG. 5 illustrates GSS candidates having a fixed position in a CSS according to an embodiment of the present invention.
Figure 5:
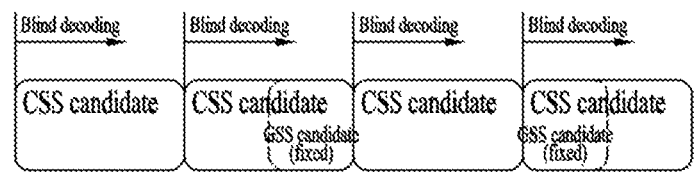

FIG. 5 illustrates GSS candidates having a fixed position in a CSS according to an embodiment of the present invention.

For example, when a GSS candidate and a CSS candidate have the same size, a start index of a CCE, corresponding to an even-numbered or odd-numbered candidate of the CSS, may be used as a start index of a CCE of the GSS candidate.

As another example, when the number of CCEs of the GSS candidate is less than that of the CSS candidate, an index of an even-numbered or odd-numbered CCE in an even-numbered or odd-numbered candidate of the CSS may be used as a start index of the CCE of the GSS candidate.

b. GSS in CORESET

When GSSs are contiguously configured without a separate RNTI like a CSS of LTE, a start index of a GSS may be given by applying offset to a start index or end index of a CSS.

The offset may be different for each cell/group. The offset may be notified to the UE via system information, higher layer signaling, or the like.

When a group common PDCCH is transmitted to a portion of a CSS (when a GSS candidate is fixed or not), a UE may assume that the group common PDCCH is transmitted only in a slot in which the CSS is transmitted or a mini-slot.

When the group common PDCCH is transmitted to a CSS and a separate resource, an interval and resource of the slot in which the group common PDCCH is to be transmitted or the mini-slot may be separately configured from the CSS.

When a size of downlink control information (DCI) of the group common PDCCH is different from DCI transmitted in the CSS, a set of slots to be monitored for the group common PDCCH by a UE may be different from a CSS monitoring set. More generally, a slot monitored by the UE or a mini-slot set may be differently configured for each RNTI or a slot monitored by the UE or a mini-slot set may be differently configured for each DCI size.

3. Slot Format Indication for Multiple Component Carriers

When a UE uses a plurality of carriers (e.g., carrier aggregation), a network may notify the UE about a slot format to be used in each carrier. In the following description, it is assumed that a slot format is indicated for each carrier, the present invention is not limited thereto and the slot format may be interpreted to be indicated for each specific frequency band (e.g., BWP). For example, a carrier or a component carrier (CC) may be interpreted in units of frequency bands.

(1) Transmission of Group Common PDCCH of Multiple CC

A network may transmit a group common PDCCH for each CC to transmit slot format indication for each CC. Alternatively, the network may indicate slot formats of all CCs through one primary CC (PCC).

When the number of CCs used by the UE is high, the network may group CCs to a plurality of groups and define a PCC for each group. The network may indicate a slot format of CCs in a corresponding group through a PCC of each group.

A method of grouping CCs is described below.

(i) CCs with the Same Slot Format

A network may group CCs with the same slot format to the same group. In this case, the network may indicate only a slot format of one CC without indicating a slot format for each CC. Accordingly, an amount of information required for slot format indication and signaling overhead may be reduced.

(ii) CCs with the Same Numerology

A network may group CCs with the same numerology to the same group. In this case, all CCs in a group may have the same slot length. Accordingly, the network may need to consider a difference in slot indexes due to a numerology difference when indicating slot formats with the same time duration.

When a network transmits slot format information on a plurality of CCs, a payload size of a group common PDCCH may be significantly increased. A maximum size of the payload of the group common PDCCH is [slot format information of 1 CC*the number of CCs] and, thus, it may be difficult to increase a size of slot format information of 1 CC. Slot format information in units of symbols requires a large amount of information and, thus, slot format indication to be used when a plurality of CCs is configured for the UE may be slot type indication or slot type indication.

A payload size of a group common PDCCH for multiple CCs may be determined whether CCs are grouped. When the grouped CCs have the same numerology, there is no problem in the case of the same indicated slot type but, when the respective CCs needs to receive indication of different slot types, it may be difficult to support a plurality of CCs by one slot format indication item.

When a slot format is indicated through a slot type pattern, a problem may arise when periods of slot formats to be indicated by CCs in a group are different. As a case in which lengths of slot formats to be received via indication are different for respective CCs, when a UE receives a slot format of a long period, the slot format may be converted into a slot format of a short period. Alternatively, the network may perform indication of a plurality of slot format periods through one slot format indication item.

For example, a pattern of a long slot period may be defined through a pattern in which a short slot period is repeated.

As another example, a pattern of a short slot period associated with a pattern of a long slot period may be predefined. Even if a UE receives a pattern of a long slot pattern, the UE may use a pattern of a short slot period matched with the corresponding pattern.

Figure 6:
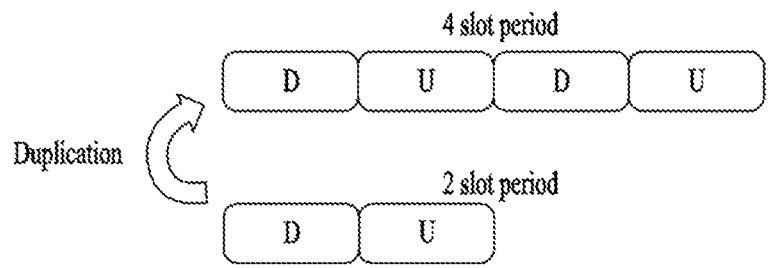
FIGS. 6 and 7 illustrate slot patterns of multiple CCs according to an embodiment of the present invention.
Figure 7:
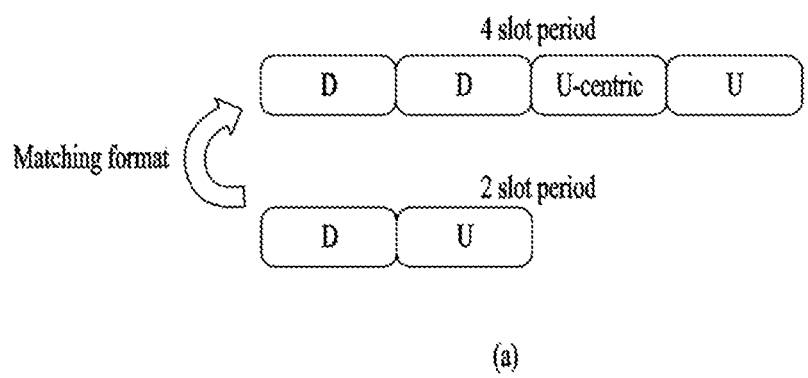
Figure 7:
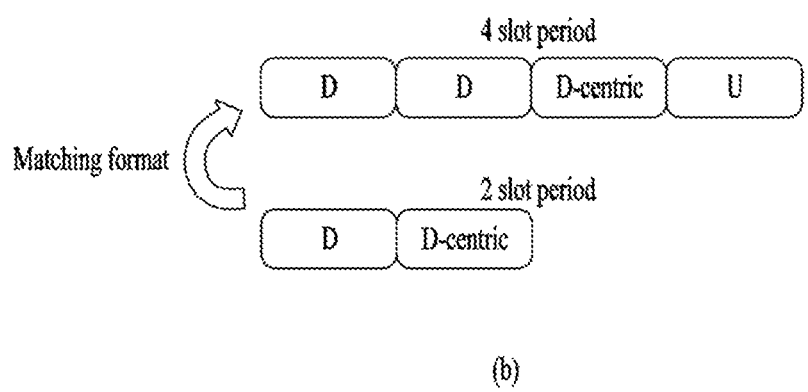

A more detailed example is described below with reference to FIGS. 6 and 7. FIGS. 6 and 7 illustrate slot patterns of multiple CCs according to an embodiment of the present invention.

In FIGS. 6 and 7, it is assumed that CCs in a group include a CC that receives indication of 4 slots as a slot pattern period and a CC that receives indication of 2 slots as a slot pattern period.

Referring to FIG. 6, a pattern of 4 slot period may be defined in the form in which patterns of 2 slot periods are repeated twice.

Referring to FIG. 7, 2-slot period patterns associated with 4-slot period patterns may be defined.

When numerologies are different for respective CCs but the CCs have the same time duration for slot pattern indication, a slot pattern period may be determined according to a difference in numerology. For example, a pattern of a short slot period may be used for a CC with short SCS and a pattern of a long slot period defined through the pattern of the short slot period may be used for a CC for large SCS. This is because, in the case of the same time duration, the number of slots of a CC with large SCS is greater than the number of slots of a CC with small SCS.

Figure 8:
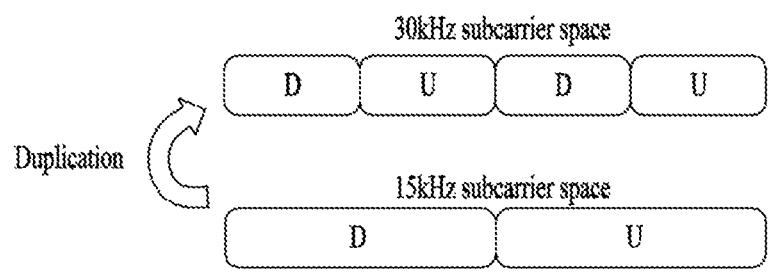
FIG. 8 illustrates slot patterns of multiple CC according to another embodiment of the present invention.
Figure 8:
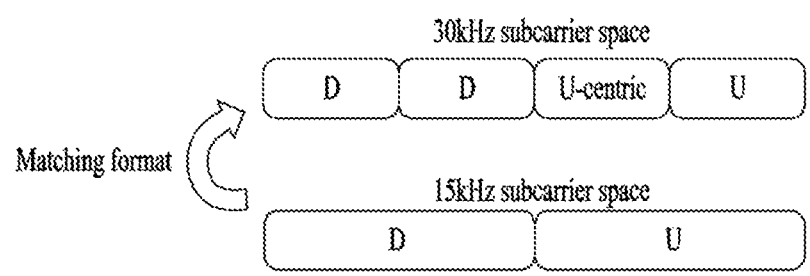

FIG. 8 illustrates slot patterns of multiple CC according to another embodiment of the present invention. It may be assumed that a pattern of 4 slots is a pattern of a CC using SCS of 30 kHz and a pattern of 2 slots is a pattern of CC using SCS of 15 kHz.

In (a) of FIG. 8, a pattern of a 4-slot period may be defined in the form in which patterns of a 2-slot period are repeated twice.

In (b) of FIG. 8, a pattern of a 4-slot period and a pattern of a 2-slot period may be associated with each other.

As such, slot patterns of a plurality of CCs using different numerologies may be indicated through one slot format indication.

When slot formats of a plurality of carriers are indicated through one group common PDCCH, a period of a slot format of each carrier may be matched based on a carrier in which the group common PDCCH is transmitted. When a period of a slot format of each carrier is shorter than a reference period, a new configuration set according to repeated patterns/periods may be given. The case in which a period of a slot format of a specific carrier is longer than a reference period may be handled in a similarly way.

(2) Slot Format Indication Methods

A CC index based on a network and a CC index based on a UE may be different. Accordingly, a network may consider a CC index different when indicating a slot format of a CC.

For example, when a CC based on a network is a NCC and a CC based on a UE is a UCC, NCC 1 may be classified into a plurality of UCCs (e.g., UCC 1 to UCC n). When the network indicates a slot format based on the UCC as a reference of the UE, the UE may appropriately recognize indicated information.

A relationship between the NCC and the UCC may be transmitted UE-specifically. For example, when the number of CCs configured as the NCC is m and the number of CCs configured as the UCC is n, a relationship between the NCC and the UCC may be defined by a network. The relationship between the NCC and the UCC may be signaled via a MAC CE, system information, or a group common PDCCH.

Table 7 below shows an example of a relationship between a NCC and a UCC with respect to one UE.

TABLE 7

| NCC1 | UCC1 |
|------|------|
|      | UCC2 |
|      | UCC3 |
| NCC2 | UCC4 |
|      | UCC5 |
| NCC3 | UCC6 |
|      | UCC7 |
|      | UCC8 |
|      | UCC9 |
| ... |      |

(i) Slot Format Indication in Terms of Network

A network may indicate a slot format based on an index of an NCC. Upon receiving indication of a slot format based on an index of the NCC, a UE may find an index of a UCC of the UE, corresponding to the NCC, and may use the indicated slot format as a corresponding slot format of the UCC of the UE.

(ii) Slot Format Indication in Terms of UE

A network may indicate a slot format based on an index of a UCC. The network may define and indicate a slot format by as much as the number UCC_max of UCCs of a UE that has a largest number of UCCs among UEs belonging to the same group. The UE that has UCCs, the number of which is less than UCC_max, may selectively obtain only indication information by as much as the number of the UCCs of the UE and may determine a slot format for each UCC of the UE.

When mapping between the NCC and the UCC is performed in a similar way with respect to a plurality of UEs, it may be easy to indicate a slot format based on a UCC index.

Figure 9:
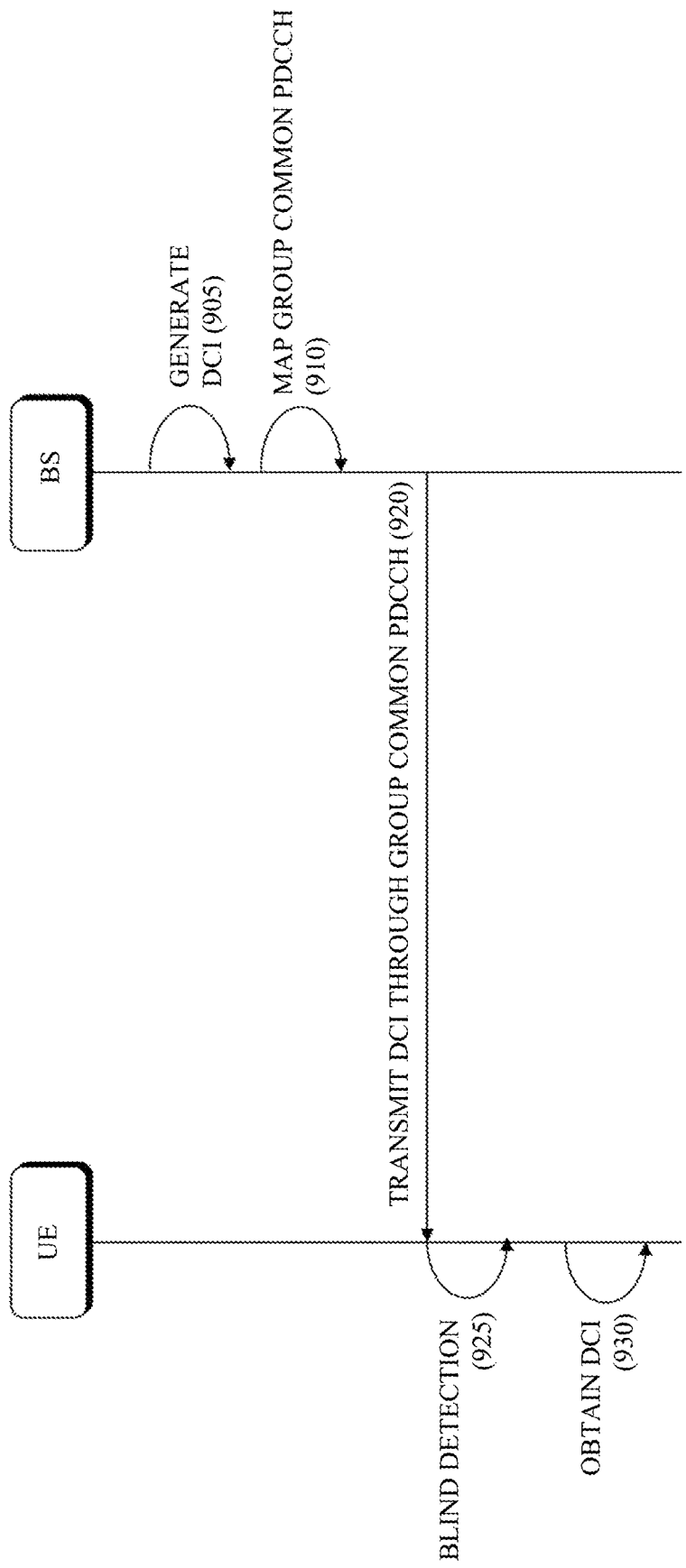
FIG. 9 illustrates a flow of a method of transmitting and receiving downlink control information (DCI) according to an embodiment of the present invention.

FIG. 9 illustrates a flow of a method of transmitting and receiving downlink control information (DCI) according to an embodiment of the present invention. FIG. 9 illustrates an example of the aforementioned methods and, thus, a repeated description of the above description may not be given here.

Referring to FIG. 9, a base station may generate downlink control information (DCI) indicating a slot format (905).

The base station may map a group common PDCCH to a common search space (CSS) having a plurality of physical downlink control channel (PDCCH) candidates (910). The group common PDCCH may be selectively mapped only on a PDCCH candidate at a predetermined position in the CSS having the plurality of PDCCH candidates.

The base station may transmit the DCI through the group common PDCCH (920).

The UE may perform blind detection for the group common PDCCH in the common search space (CSS) having the plurality of physical downlink control channel (PDCCH) candidates (925). The UE may selectively attempt to detect the group common PDCCH only on a PDCCH candidate at a predetermined position in the CSS having the plurality of PDCCH candidates.

The UE may obtain downlink control information (DCI) indicating a slot format from the blind-detected group common PDCCH (930).

The UE may receive information regarding the group common PDCCH via higher layer signaling. The UE may determine a PDCCH candidate at a predetermined position via blind detection of the group common PDCCH through information regarding the group common PDCCH.

A radio network temporary identifier (RNTI) for slot format indication may be allocated to the UE. The UE may perform blind detection for the group common PDCCH using the RNTI for slot formation indication.

The UE may determine whether the PDCCH candidate at a predetermined position corresponds to the group common PDCCH by checking cyclic redundancy check (CRC) information of a PDCCH candidate at a predetermined position using the RNTI for slot format indication.

The UE may attempt to detect other PDCCHs for carrying different DCI from the DCI indicating a slot format on the other PDCCH candidates in which detection of the group common PDCCH is not attempted among the plurality of PDCCH candidates included in the CSS. The UE may also attempt detection of other PDCCHs along with the group common PDCCH on the PDCCH candidate at a predetermined position.

The UE may attempt detection of the group common PDCCH at least for an initial PDCCH candidate among the plurality of PDCCH candidates included in the CSS.

The group search space (GSS) for the group common PDCCH may be configured in the CSS.

The number of PDCCH candidates at a predetermined position for blind detection of the group common PDCCH may not be greater than the number of the plurality of PDCCH candidates included in the CSS.

When the number of the PDCCH candidates at the predetermined position is two or greater, the two or more PDCCH candidates for blind detection of the group common PDCCH may be contiguous.

The UE may receive slot format patterns that correspond to a plurality of slots, respectively, via higher layer signaling. One of the slot format patterns may be indicated to the UE through DCI.

Figure 10:
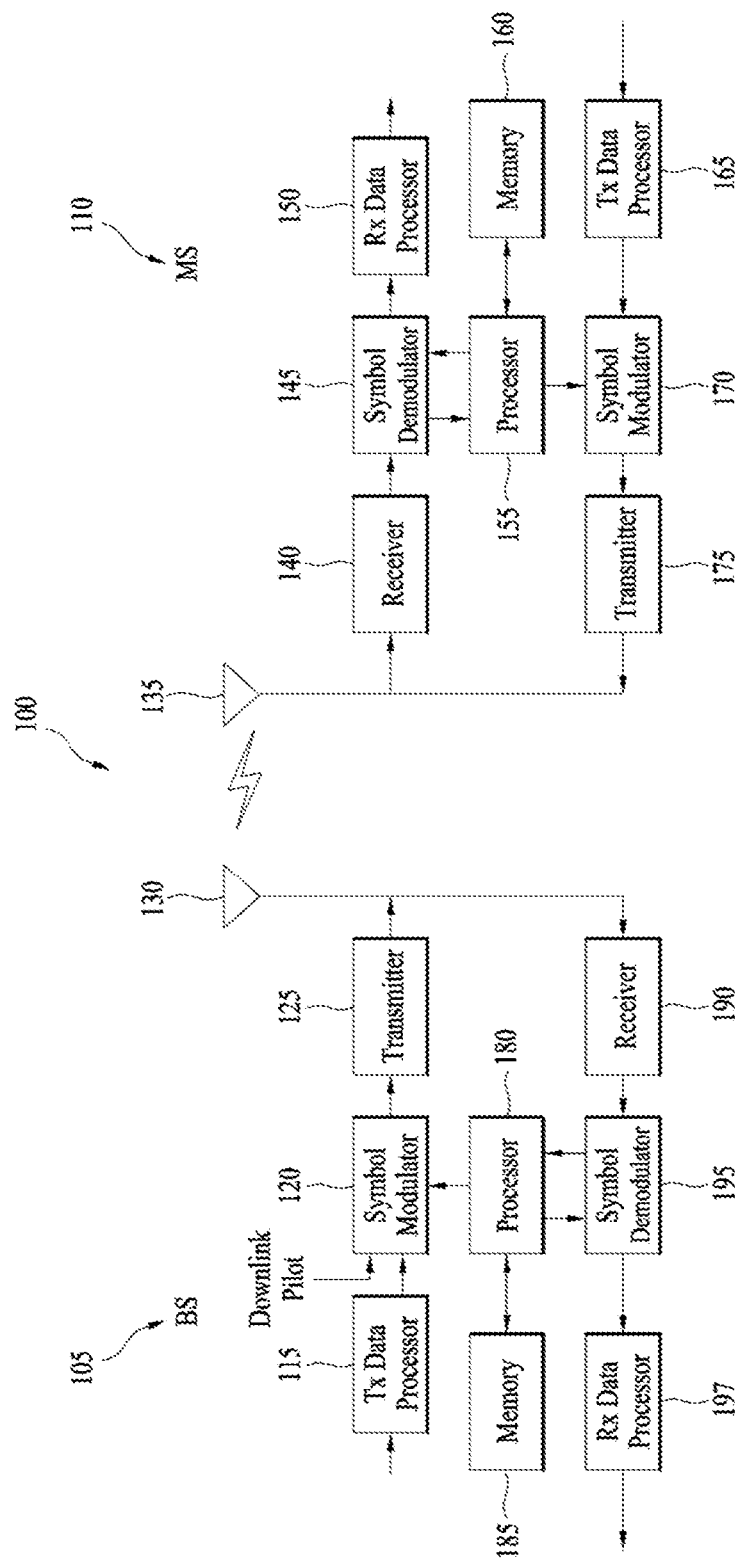
FIG. 10 illustrates a base station (BS) and a user equipment (UE) according to an embodiment of the present invention.

FIG. 10 is a block diagram illustrating a structure of a base station (BS) 105 and a UE 110 in a wireless communication system 100 according to an embodiment of the present invention. The BS 105 may be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As described above, the present invention may be applied to various wireless communication systems.

The invention claimed is:

1. A method of receiving downlink control information (DCI) by a user equipment (UE) in a wireless communication system, the method comprising:
performing blind detection for a group common physical downlink control channel (PDCCH) in a common search space (CSS) having a plurality of PDCCH candidates; and
obtaining downlink control information (DCI) indicating a slot format from the blind-detected group common PDCCH,
wherein in the blind detection of the group common PDCCH, the UE selectively attempts to detect the group common PDCCH only at a predetermined position in the CSS having the plurality of PDCCH candidates,
wherein the UE determines a type of each symbol included in a slot based on the slot format indicated by the DCI,
wherein, in a state in which a number of PDCCH candidates at the predetermined position is two or more, the two or more PDCCH candidates for blind detection of the group common PDCCH are contiguous, and
wherein the UE determines the PDCCH candidates at the predetermined position based on information regarding the group common PDCCH that is received through higher layer signaling.

2. The method according to claim 1, wherein a radio network temporary identifier (RNTI) for slot format indication is allocated to the UE; and
wherein the UE performs blind detection for the group common PDCCH using the RNTI for slot format indication.

3. The method according to claim 1, wherein the UE attempts to detect other PDCCHs for carrying different DCI from the DCI indicating the slot format, on the other PDCCH candidates in which detection of the group common PDCCH is not attempted among the plurality of PDCCH candidates included in the CSS.

4. The method according to claim 3, wherein the UE attempts to detect the other PDCCHs along with the group common PDCCH at the predetermined position.

5. The method according to claim 1, wherein in the blind detection of the group common PDCCH, the UE attempts to detect the group common PDCCH at least for an initial PDCCH candidate among the plurality of PDCCH candidates included in the CSS.

6. The method according to claim 1, wherein a group search space (GSS) for the group common PDCCH is configured in the CSS.

7. The method according to claim 1, wherein the number of the PDCCH candidates at the predetermined position for the blind detection of the group common PDCCH is not greater than a number of the plurality of PDCCH candidates included in the CSS.

8. The method according to claim 1, further comprising:
receiving slot format patterns each corresponding to a combination of a plurality of slots via higher layer signaling,
wherein one of the slot format patterns is indicated to the UE through the DCI.

9. The method according to claim 1, wherein the type of the each symbol included in the slot corresponds to a first type for downlink, a second type for uplink, or a third type in which determination of downlink/uplink is reserved.

10. At least one non-transitory computer readable medium operably connected to at least one processor and storing instructions that, based on being executed by the at least one processor, perform operations including the method of claim 1.

11. A method of receiving downlink control information (DCI) by a user equipment (UE) in a wireless communication system, the method comprising:
performing blind detection for a group common physical downlink control channel (PDCCH) in a common search space (CSS) having a plurality of PDCCH candidates; and
obtaining downlink control information (DCI) indicating a slot format from the blind-detected group common PDCCH,
wherein in the blind detection of the group common PDCCH, the UE selectively attempts to detect the group common PDCCH only on a PDCCH candidate at a predetermined position in the CSS having the plurality of PDCCH candidates,
wherein the UE determines a type of each symbol included in a slot based on the slot format indicated by the DCI,
wherein a radio network temporary identifier (RNTI) for slot format indication is allocated to the UE, wherein the UE performs blind detection for the group common PDCCH using the RNTI for slot format indication, and wherein, in the blind detection of the group common PDCCH, the UE attempts to detect the group common PDCCH from the PDCCH candidate at the predetermined position by checking cyclic redundancy check (CRC) information of the PDCCH candidate at the predetermined position using the RNTI for slot formation indication.

12. A method of transmitting downlink control information (DCI) by a base station (BS) in a wireless communication system, the method comprising:

generating downlink control information (DCI) indicating a slot format;

mapping a group common physical downlink control channel (PDCCH) to a common search space (CSS) having a plurality of PDCCH candidates; and transmitting the DCI through the group common PDCCH, wherein the group common PDCCH is selectively mapped only at a predetermined position in the CSS having the plurality of PDCCH candidates, wherein the slot format indicated by the DCI defines a type of each symbol included in a slot, wherein, in a state in which a number of PDCCH candidates at the predetermined position is two or more, the two or more PDCCH candidates for the group common PDCCH are contiguous, and wherein the number of the PDCCH candidates at the predetermined position for the group common PDCCH is not greater than a number of the plurality of PDCCH candidates included in the CSS.

13. A user equipment (UE) configured to receive downlink control information (DCI), the UE comprising:

a receiver;

at least one processor; and at least one computer memory operably connected to the at least one processor and storing instructions that, based on being executed by the at least one processor, perform operations comprising:

performing blind detection, through the receiver, for a group common physical downlink control channel (PDCCH) in a common search space (CSS) having a plurality of PDCCH candidates; and obtaining, through the receiver, downlink control information (DCI) indicating a slot format from the blind-detected group common PDCCH, wherein in the blind detection of the group common PDCCH, the at least one processor selectively attempts to detect the group common PDCCH only at a predetermined position in the CSS having the plurality of PDCCH candidates, wherein the at least one processor determines a type of each symbol included in a slot based on the slot format indicated by the DCI, wherein, in a state in which a number of PDCCH candidates at the predetermined position is two or more, the two or more PDCCH candidates for the group common PDCCH are contiguous, and wherein the at least one processor determines the PDCCH candidates at the predetermined position based on information regarding the group common PDCCH that is received through higher layer signaling.

14. A base station (BS) for transmitting downlink control information (DCI), the BS comprising:

a processor to generate downlink control information (DCI) indicating a slot format and to map a group common physical downlink control channel (PDCCH) to a common search space (CSS) having a plurality of PDCCH candidates; and a transmitter to transmit the DCI through the group common PDCCH under control of the processor, wherein the group common PDCCH is selectively mapped only at a predetermined position in the CSS having the plurality of PDCCH candidates, wherein the slot format indicated by the DCI defines a type of each symbol included in a slot, wherein, in a state in which a number of PDCCH candidates at the predetermined position is two or more, the two or more PDCCH candidates for the group common PDCCH are contiguous, and wherein the number of the PDCCH candidates at the predetermined position for the group common PDCCH is not greater than a number of the plurality of PDCCH candidates included in the CSS.

* * * * *